July 23, 1968     C. A. JOHNSON ET AL     3,393,696

WATER PURIFYING APPARATUS

Original Filed Jan. 4, 1965     3 Sheets-Sheet 1

INVENTORS.
CHARLES A. JOHNSON.
PETER J. LUNDE.
BY Raymond Curtin

ATTORNEY.

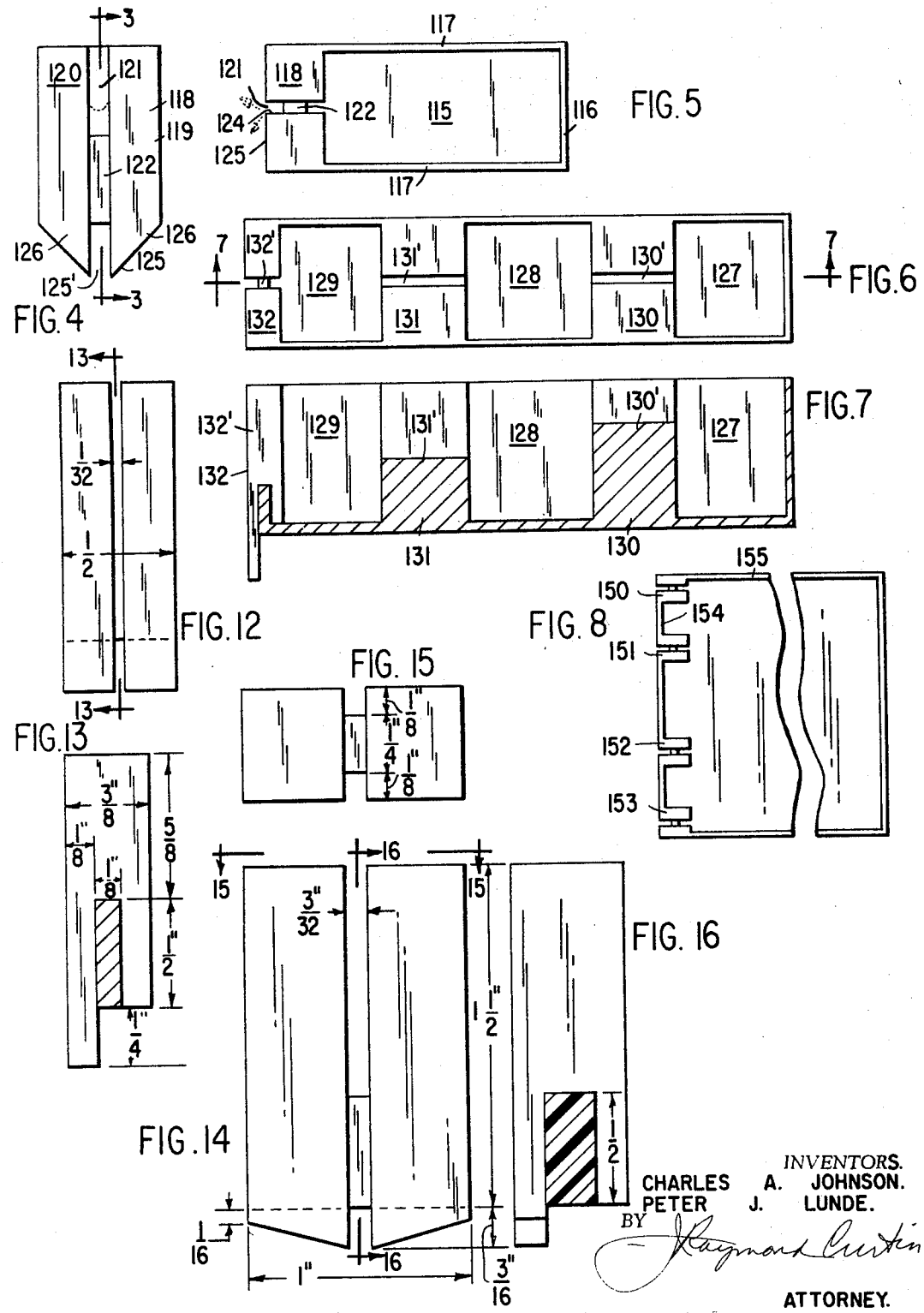

July 23, 1968   C. A. JOHNSON ET AL   3,393,696
WATER PURIFYING APPARATUS
Original Filed Jan. 4, 1965   3 Sheets-Sheet 3
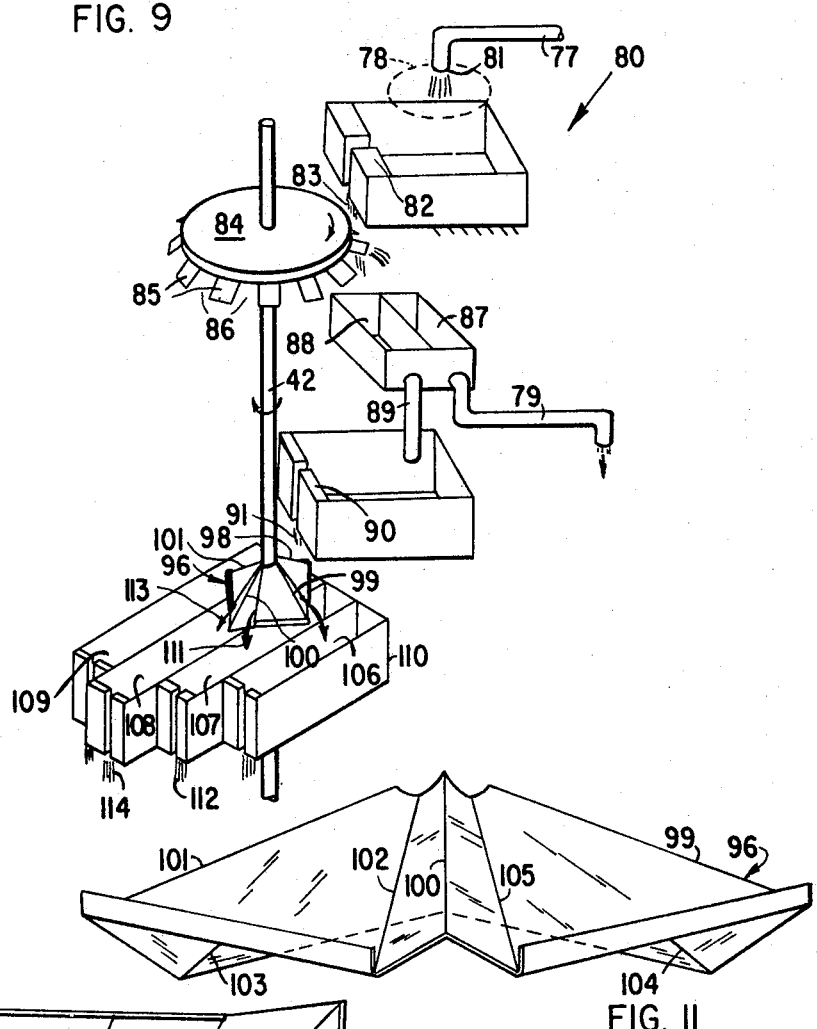
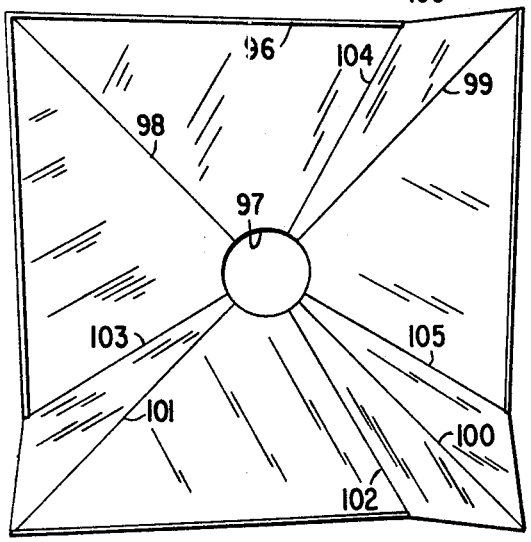
INVENTORS.
CHARLES A. JOHNSON.
PETER J. LUNDE.
BY
ATTORNEY.

United States Patent Office 3,393,696
Patented July 23, 1968

3,393,696
WATER PURIFYING APPARATUS
Charles A. Johnson and Peter J. Lunde, Cazenovia, N.Y., assignors to Carrier Corporation, Syracuse, N.Y., a corporation of Delaware
Original application Jan. 4, 1965, Ser. No. 423,053. Divided and this application Oct. 18, 1965, Ser. No. 510,121
15 Claims. (Cl. 137—262)

This application is a division of copending application, Ser. No. 423,053, filed Jan. 4, 1965, now Patent No. 3,333,436, for "Water Purifying Apparatus."

The present invention relates to improved apparatus for purifying water in relatively small quantities.

The term "purified water" as used herein means water from which all or a substantial proportion of impurities have been removed by flow through the apparatus or method forming the subject of the invention.

In the past, various types of apparatus have been used for purifying impure water, such as sea water, brackish water or water containing other contaminants, by a selective freezing process wherein a portion of the water content was frozen into ice particles and the remaining impurities which remained in solution were washed from the ice particles which, in turn, were melted to provide purified water. However, apparatus of the foregoing type was generally designed for producing large quantities of water, but there was no expedient and economical way of producing small quantities.

It is accordingly the primary object of the present invention to provide an improved apparatus capable of converting impure water into small quantities of potable water by a selective freezing process in an extremely efficient and economical manner. A related object of the present invention is to provide apparatus of the foregoing type which is fully automatic in operation. A still further related object of the present invention is to provide apparatus of the foregoing type which not only has a low initial cost because of its economically integrated components but also has a low operating cost because of its high efficiency. Yet another related object of the present invention is to provide apparatus of the foregoing type which is highly reliable in operation notwithstanding that it utilizes highly simplified components capable of providing long trouble-free operation.

Another object of the present invention is to provide an improved apparatus for converting impure water into purified water which, automatically and inherently, provides proper feeds and distribution of both the impure water to the apparatus and the purified water from the apparatus. Another related object of the present invention is to provide apparatus of the foregoing type which is capable of producing small quantities of potable water by a freezing process without excessive wash requirements for removing impurities from the ice formed during the freezing process. A further related object of the present invention is to provide improved water purifying apparatus which effectively eliminates the influence of surface effects and changes in temperature on the small flows handled by the apparatus. Other objects and attendant advantages of the present invention will be readily perceived hereafter.

The improved water purifying apparatus of the present invention contains a plurality of components which are uniquely integrated so as to cause the apparatus to be extremely efficient in separating purified water from impure water in relatively small quantities under varying operational conditions. The apparatus includes a freezing chamber which is cooled by a conventional refrigeration system. A portion of the impure water which is fed to the chamber is frozen into pure ice on the wall of the chamber while the impurities remain in solution. By providing a predetermined amount of refrigeration and by maintaining the flow of impure water to the freezing chamber substantially constant regardless of changing flow conditions, a predetermined ratio between ice and water containing impurities is maintained within the freezing chamber. This predetermined ratio not only insures that only pure water will be frozen and that the impurities will remain in solution, but also that sufficient water is frozen to cause the apparatus to operate efficiently. A single motor is provided for operating all of the mechanical components of the apparatus exclusive of the refrigeration system. This causes the initial cost of the apparatus to be relatively low and further causes all of the components driven by a common motor source to operate in predetermined timed relationship. More specifically, the motor drives a shaft mounted scraper which removes the ice which is frozen on the chamber wall. Furthermore, a simple pump is driven from the shaft for pumping purified water which is obtained as a result of melting purified ice produced in the freezing chamber. The pump is of the bellows type and therefore produces an intermittent pumping action. The purified water which is pumped by the shaft driven pump is thereafter split into two portions having a predetermined ratio by a combined flow smoothing and flow splitting construction. The flow splitter and smoother by its inherent construction effectively eliminates the influence of changes in surface effects on small flows of the magnitude handled by the instant apparatus. One of said portions of purified water is conducted to a storage tank for subsequent use and the other portion is applied to the top of the ice-water mixture in a wash column above the freezing chamber to wash the solution containing impurities from between the ice particles. In order to divide the intermittent flow into the above two portions, it is first fed to a flow smoothing weir which converts the intermittent stream produced by the pump into a continuous stream which is capable of being accurately split into the above mentioned two portions. The wash water portion is applied evenly and continuously to the top of the ice in the wash column above the freezing chamber to thereby insure thorough and efficient washing with a minimum of wash water, thereby conserving purified water. The flow splitter and smoother is driven by the above mentioned shaft which drives both the scraper and the purified water pump. Thus, a uniquely integrated water purifying apparatus is provided which uses a single motor to drive all of the operating components and inherently causes them to maintain proper flows through all parts of the apparatus. The present invention will be more fully understood when the following portions of the specification are read in conjunction with the accompanying drawings wherein:

FIGURE 4 is a view taken along line 4—4 of FIGURE 3;

FIGURE 5 is a plan view of the flow smoothing weir of FIGURE 3;

FIGURE 6 is a view of a modified type of flow smoothing weir;

FIGURE 7 is a cross sectional view taken along line 7—7 of FIGURE 6;

FIGURE 8 is a plan view of a flow splitting weir;

FIGURE 9 is a schematic view of a combined flow smoothing and splitting apparatus for purified water which may be used in conjunction with the apparatus of FIGURE 1;

FIGURE 10 is an enlarged plan view of the flow splitter of FIGURE 9;

FIGURE 11 is a side elevational view of the flow splitter of FIGURE 10;

FIGURE 12 is a front elevational view of the outlet wall of a flow leveling weir made from an oxidized brass and having dimensions thereon;

FIGURE 13 is a view taken along line 13—13 of FIGURE 12 for the purpose of showing dimensions;

FIGURE 14 is a view of the front face of a flow smoothing weir made out of "Plexiglas";

FIGURE 15 is a view taken in the direction of line 15—15 of FIGURE 14 for the purpose of showing dimensions; and FIGURE 16 is a view taken along line 16—16 of FIGURE 14 for the purpose of showing dimensions.

Figure 1:
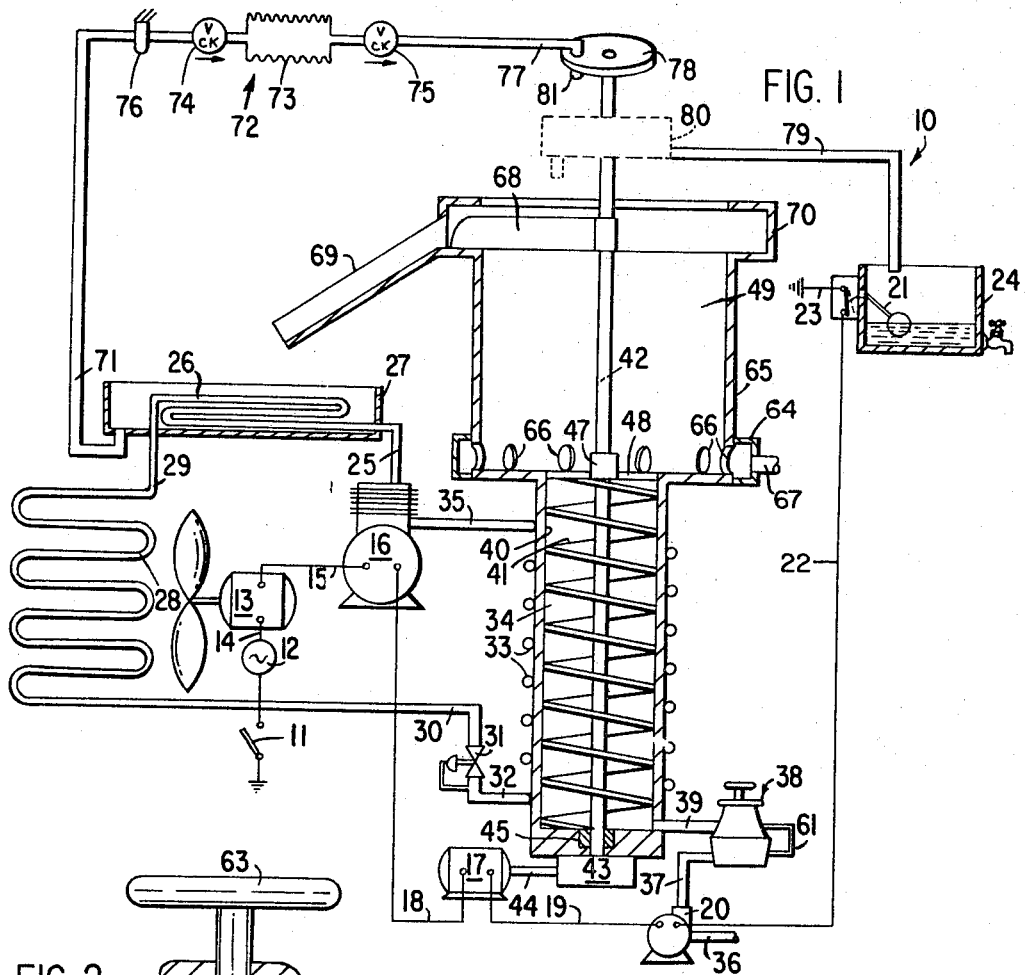
FIGURE 1 is a schematic view of the improved water purifying apparatus of the present invention.

In FIGURE 1 the improved water purifying apparatus 10 is schematically shown. In order to initiate operation of the apparatus, switch 11 is closed to thereby ground electrical current source 12 and cause flow of current to condenser fan 13 through lead 14 to compressor 16 through lead 15 and thereafter to motor 17 through lead 18. In addition, current will flow through lead 19 to impure water pump 20 and thereafter to float switch 21 through lead 22, the circuit being completed by lead 23 coupled to ground. Assuming that storage tank 24, which holds purified water is sufficiently empty, float switch 21 will be in a closed position to permit completion of the foregoing circuit. Whenever storage tank 24 is full, switch 21 will be open and the above described series circuit cannot be completed to cause operation of the various elements therein.

Upon completion of the foregoing circuit, the refrigeration system which forms a part of the present apparatus will be caused to function. More specifically, compressor 16 will cause compressed refrigerant to pass into conduit 25 which leads to a coil 26 within receptacle 27. Briefly, pure ice which was separated from the impure water is dumped onto coil 26 and the heat of the refrigerant will melt it. However, the final condensing function is performed in main condenser 28 which is coupled to coil 26 through conduit 29. Fan 13 blows air over condenser 28 in a conventional manner to cool refrigerant. Thereafter the refrigerant passes through conduit 30, through expansion valve 31 where it is expanded, and thereafter the refrigerant flows through conduit 32 to evaporator coil 33 which encircles cylindrical chamber 34. The refrigerant thereafter returns to compressor 16 through conduit 35. The foregoing refrigeration circuit, being well known in the art, will not be described further.

As noted above, the water purifying equipment 10 functions by freezing out particles of ice containing purified water from impure water, washing the remaining concentrated impure solution from the outside of the ice particles, and thereafter melting the ice particles to obtain purified water. In order to accomplish the foregoing objective, pump 20 will cause impure water to flow from a source not shown into conduit 36. It will be appreciated, however, that if a source of sufficient pressure is available, pump 20 may be eliminated. The impure water thereafter flows through conduit 37 to feed flow regulator 38 which functions to supply a constant volume of water to conduit 39 leading to cylindrical chamber 34. The impure water thus supplied to chamber 34 is caused to freeze on internal cylindrical surface 40 and thus a portion is formed into pure ice. This portion is removed from cylindrical wall 40 by auger 41 mounted on shaft 42, which is driven by gear box 43 in turn coupled to motor 17 by linkage 44. The lower end of shaft 42 is journalled in bearing-seal 45 and an upper portion thereof is journalled in bearing 47 supported by spider legs 48. As shaft 42 rotates ice will be continuously removed from cylindrical wall 40 and caused to pass upwardly from freezer chamber 34 into washing chamber 49, which essentially is a continuation of chamber 34.

At this point it is be noted that for optimum operation a predetermined ratio must be maintained between the amount of ice which is formed and the amount of concentrated solution which remains. This ratio will vary with a number of factors including the amount of impurities in the water and the purity which is desired of the final product. It has been found that a ratio of 50% ice particles and 50% solution is generally satisfactory. It will be appreciated that if there is too great a flow of water into chamber 34 with respect to the refrigerating capacity there will be a waste of refrigerating capacity inasmuch as insufficient amounts of ice will be formed. On the other hand, if there is too small a flow of water into chamber 34, too much of it will be frozen and the excess solidification will not only cause the ice to jam the machine, but will cause the impurities to be frozen into the ice particles and therefore render them incapable of removal.

Accordingly, since it is rather critical that the proper flow be maintained to chamber 34, such flow is effected by flow feed regulator 38 (FIGURES 1 and 2) which insures a constant flow to chamber 34 irrespective of restrictions to flow which may be occasioned by virtue of the formation of ice within chamber 34 blocking off the end of conduit 39 and irrespective of variations in pressure in conduit 37. The method employed utilizes the known fact that a particular flow rate of fluid through a restriction in a conduit will be accompanied by a particular pressure drop across the restriction. If the restriction is a capillary tube and the flow is in the laminar region, the pressure drop will be a linear function of the flow rate. A flow control device can therefore be operated by sensing the pressure difference across a restriction and operating a control valve so as to maintain a flow to give a predetermined pressure drop across the restriction.

Figure 2:
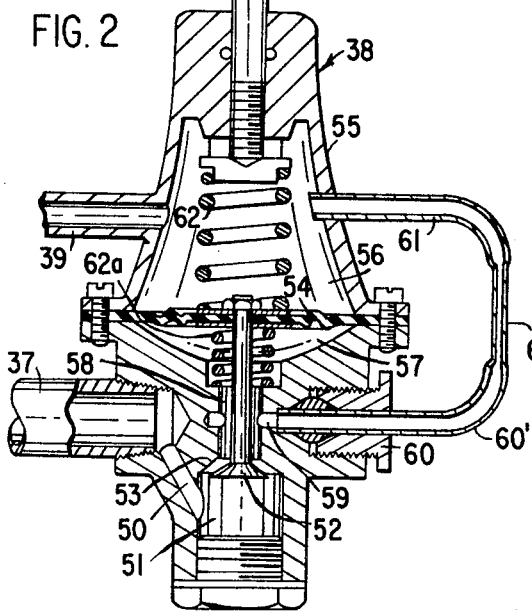
FIGURE 2 is a schematic view of a control valve for causing impure water to be fed at a constant rate to the water freezing chamber of the apparatus of FIGURE 1 irrespective of restrictions to flow in the chamber.

Referring to FIGURE 2, the restriction, 60a, a capillary tube, is in communication with chamber 56 of valve housing 55 via conduit 61 on the downstream end and is in communication with chamber 57 via conduits 58, 59, 60 and 60' on the upstream end. Since these conduits are large relative to the flow through them, the pressures in chambers 57 and 56 are virtually the same as the pressures upstream and downstream of the capillary. It should be noted that the pressure in chamber 57 will always be greater than or equal to that in chamber 56. It will be noted from FIGURE 2 that inflow conduit 37 communicates with chamber 57 through valve conduits 50, 51 and 58, conduits 51 and 58 being separated by poppet valve 52 and its associated seat 53.

The net force exerted on the diaphragm 54 which separates 56 and 57 is the net force of the springs 62 and 62a plus the difference between the pressure in the chambers 56 and 57 multiplied by the area of the diaphragm. If the net force on the diaphragm is different from zero, it will move thus opening or closing poppet valve 52 which is attached thereto. It will be seen that a movement of the diaphragm 54 downwardly will cause the valve 52 to open relative to valve seat 53, thus permitting more flow through it and a movement upwardly will restrict the flow between valve 52 and seat 53.

If the difference between the pressure in chambers 57 and 56 is less than the predetermined value set by the adjustment of the compression of spring 62 by means of screw 63, this is an indication that the flow through capillary 60a is less than desired and the diaphragm will move downwardly thus increasing the flow and restoring it closer to the desired value. Likewise, a pressure difference between chambers 57 and 56 which is greater than the predetermined value is indicative that the flow through the capillary exceeds the desired value and the diaphragm will move upwardly thus closing the valve and returning the flow closer to the desired value.

The flow controller 38 herein described will maintain substantially constant flow into the system irrespective of changes in some of the conditions outside the feed controller. Specifically, any tendency of the flow to be blocked by ice formations in the freezer will be overcome by the controller, which will attempt to maintain the flow constant by causing a pressure as great as the full inlet line pressure to be exerted on the ice blockage as a result of the opening of valve 52 as a result of increased pressure in chamber 56. Similarly normal variations in feed line pressure will also be overcome by the flow regulator since changes in flow through the poppet valve as a result of changes of pressure in conduits 37 and 50 will result in pressure changes in chambers 56 and 57 and a corresponding movement of the diaphragm and poppet valve to readjust the flow to the desired value.

Having thus established a constant flow of impure water to chamber 34 to balance the refrigeration capacity and thus obtain a predetermined ratio of ice to unfrozen water within chamber 34, the apparatus 10 will further function to separate the ice which is purified water from the concentrated solution containing impurities. More specifically, the rotation of auger 41 will remove the ice from the wall 40 and cause it to move upwardly with the concentrated solution into wash chamber 49 as the apparatus operates. At this point it will be noted that a manifold 64 encircles the outer wall 65 of wash chamber 49 and communication is effected between wash chamber 49 and manifold 64 through apertures 66 in wall 65. A portion of the concentrated solution in the ice moving up into chamber 49 will drain through apertures 66 into manifold 64 from which this drainage will pass to waste through conduit 67. A certain portion, however, of the solution wil be carried upwardly above the level of apertures 66 with the ice in chamber 49, and it is required that this remaining solution be washed from the ice prior to remelting the ice to obtain purified water therefrom. Actually, if the ice remains within chamber 49 for a sufficiently long time, the combination of the draining of the concentrated liquid downwardly through apertures 66 and the air induced self-melting of the pure ice particles will provide a washing action which cleans a sufficient amount of the impurities from the ice so as to cause the remaining ice to be relatively pure. This effect is utilized during start-up with the result that no wash water need be supplied from the above mentioned flow splitting and smoothing system initially. The first melt water thus produced will be higher in impurities than that obtained later when full washing is in progress but the initial product water is relatively much more pure than the feed water. This type of start-up is referred to as boot strapping.

After a sufficient amount of ice is formed in wash chamber 49 it will be removed therefrom to provide purified water. In this respect a blade 68 is keyed to shaft 42 and rotates therewith to remove top portion of the rising column of ice in chamber 49 and causes it to drop onto chute 69 which deposits said ice on hot gas coil 26 within receptacle 27, the heat of said coil melting said ice. It is to be noted that a collar 70 is provided at the top of wall 65 and the portion of this collar in the vicinity of chute 69 is cut away to permit the ice to drop onto chute 69.

The purified water which is formed as a result of melting ice within receptacle 27 enters conduit 71 which is in communication with bellows pump 72, consisting of a bellows 73 and one way check valves 74 and 75 on the entry and exit sides of the pump 72, respectively. Conduit 71 leading to pump 72 is fixed to the frame of the machine at 76 while conduit 77 leading from pump 72 is eccentrically mounted on disc 78 keyed to main shaft 42. It will be appreciated that as shaft 42 rotates, the movement of conduit 77 will cause alternate contraction and expansion of bellows 73 and thus cause liquid to be intermittently taken into bellows 73 as it expands because at this time check valve 75 will remain closed and thereafter cause such liquid to be expelled through conduit 77 as the bellows is caused to contract while check valve 74 remains closed. Since the volumetric flow rate pumped by the bellows is fixed by the rotational speed of shaft 42, the eccentricity of outlet 81, and the dimensions of bellows 73, when purified water is melted at less than the fixed volumetric flow rate, the entrance to conduit 71 will be pumped dry and the excess flow rate will be delivered as air.

At this juncture it is to be noted that the instant water purifying apparatus is intended to provide approximately 20 gallons per day. Thus assuming that it operates for a full twenty-four hours, it will produce less than one gallon of pure water per hour. It will be readily appreciated therefore that the flows of purified water through the machine are extremely small, and this being the case, certain flows would be greatly affected by contamination and surface effects to which various components of the apparatus are subjected.

The water which is pumped through conduit 77 in the above described manner is utilized for two purposes. A first predetermined portion thereof is conducted to storage tank 24 by conduit 79 and a second predetermined portion thereof is applied to the ice at the top of chamber 49 for the purpose of washing the remaining impure water downwardly and thus permit only pure ice to remain for subsequent melting in receptacle 27, as described above. The dividing of the intermittently supplied purified water is performed by flow smoother and splitter 80 which also operates in timed relationship with the rotation of shaft 42 from which it is driven. At this juncture it is to be again noted that the splitting of the flow into the two above noted portions is critical because if too much is used for wash water there is a waste of purified water and if too little is used, the ice particles will not be sufficiently clean to provide purified water on melting. As noted above, the water is intermittently conducted through conduit 77 from bellows pump 72. This intermittent flow is difficult to divide because the quantities are small. Furthermore, the amount of purified water which is utilized as wash water should preferably be applied to the top of the ice in chamber 49 continuously and evenly around the column for maximum washing efficiency. For both of the foregoing reasons, the uneven flow must be evened out.

A flow leveler and splitter 80 which may be utilized in the apparatus of FIGURE 1 is shown in FIGURE 9. The outlet end 81 of conduit 77 overlies flow leveling weir 82 which is affixed to the frame of the machine. A suitable collecting gutter or the like, not shown, is affixed to flow leveling weir 82 for receiving water from the outlet of conduit 77 and routing it to weir 82. This gutter may be in the form of an annular ring (not shown). However, it will be appreciated that the discharge from conduit 77 will be only during 180° of rotation of disc 78 because of the fact that the pumping mechanism inherently provides a discharge stroke during one half of the rotation of the disc and an intake stroke on the other half. The intermittently supplied purified water to weir 82 is caused to be discharged from the weir in a constant stream as will become more apparent hereafter in conjunction with the description of FIGURES 3–7. However, at this point it is to be accepted that the stream 83 is a smooth and steady one.

Flow splitting of stream 83 is effected by a disc 84 having a plurality of projecting vanes 85 with spaces 86 therebetween, disc 84 being mounted for rotation with shaft 42. It will be appreciated that the entire periphery including vanes 85 and spaces 86 must add up to 360° and therefore by proportioning the ratio of spaces 86 to vanes 85, the water of stream 83 may be divided in given proportions as will become apparent. More specifically, during rotation of disc 84, whenever a vane 85 underlies stream 83, the water will be deflected by said vane into receptacle 87 from whence it passes through conduit 79 to storage tank 24 (FIGURE 1). However, when a blank space 86 is directly below stream 83, said stream will enter receptacle 88 mounted on the frame of the machine. Thereafter, the intermittent flow from receptacle 88 passes through conduit 89 to flow smoothing weir 90, which is also mounted on the frame of the machine. Weir 90 may be of the construction shown in FIGURES 3–5. The flow emanates from weir 90 in a steady stream 91 and impinges on various portions of flow splitter 96 (FIGURES 9, 10 and 11) which will be described in greater detail hereafter, flow splitter 96 being keyed to shaft 42 for rotation.

Flow splitter 96 consists of a plate of sheet metal or plastic which is bent in the manner shown in FIGURES 10 and 11 and has a central aperture 97 which fits around shaft 42. Splitter 96 includes four peaks 98, 99, 100 and 101, and the space between each pair of adjacent peaks encompasses 90° of the periphery. Intermediate pairs of adjacent peaks are lower creases, with lower crease 102 lying between peaks 100 and 101, lower crease 103 lying between peaks 98 and 101, lower crease 104 lying between peaks 98 and 99 and lower crease 105 lying between peaks 99 and 100. Since each of the peaks are approximately 90° apart, it can readily be appreciated that the portion of the splitter between each pair of peaks will underlie stream 91 for approximately 90° of travel of the entire splitter 96. However, as can be seen from FIGURE 10, each of the lowermost creases 102, 103, 104 and 105 terminate in a position which is directly above a different weir of the four weirs 106, 107, and 108 and 109 which form the wash water distributor 110. For example, as can be seen from FIGURE 9, while stream 91 drops between peaks 99 and 100, the flow will be in the direction of arrow 111 into weir 107 and thereafter because of the smoothing action which is the same as will be described below with respect to FIGURES 3–5, an even flow 112 will pass from weir 107 onto the ice in chamber 49. Furthermore, the flow which hits between peaks 100 and 101 will flow in the direction of arrow 113 into weir 108 and a steady stream 114 will thus pass from weir 108 because of its flow smoothing action. Analogous action occurs with respect to weirs 106 and 109.

It can readily be seen that the exit streams of each of weirs 106, 107, 108 and 109 is a different distance from the center of shaft 42 and therefore as shaft 42 rotates, four concentric circles of fresh water leaving weirs 106–109 will be applied to the ice in the top of chamber 49. Thus regardless of the intermittent supply provided by pump conduit 77 leading from bellows pump 73, smooth flow of purified water will be applied to the surface of the wet ice emerging from wash chamber 49 for maximum efficiency.

It will be apreciated that a plurality of weirs, such as 106–109, shown in FIGURE 9, are utilized only when the diameter of chamber 49 is relatively large. If it is relatively small, a lesser number of weirs may be utilized because while the wash water impinges on the top of the ice in a circular line, it will spread into the shape of a cone in moving downwardly through the ice because of the nature of the diffusion through the ice formation.

The foregoing action of the water purifying apparatus 10 will continue until such time as storage tank 24 is full whereupon float valve 21 will be actuated to terminate the operation of all components of the electrical circuit which it controls and shut the machine off. Whenever the level in storage tank 24 falls below a predetermined value, the apparatus will again automatically start up to provide purified water.

Figure 3:
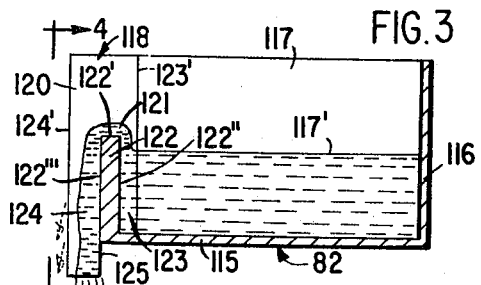
FIGURE 3 is a view of the water smoothing weir for causing the flow of purified water to be substantially constant irrespective of short term fluctuations in the supply thereto, said figure being taken substantially along line 3—3 of FIGURE 4.

Flow smoother or leveler 82 (FIGURE 9) may have the construction shown in FIGURES 3–5. More specifically, flow smoother or weir 82 is essentially a box-like tank having a bottom 115, an end wall 116, a pair of side walls 117 and a front or outlet wall 118. Front wall 118 is split into two sections 119 and 120 divided by slot 121 having weir barrier 122 therein. The entrance section 123 to weir barrier 122 must provide a sufficiently large distance between inner face 123' of wall 118 and inner face 122" of weir barrier 122 to prevent changes in surface effects of the water entering slot 121 from affecting the liquid overflowing weir barrier 122. Surface effects as used herein manifest themselves in the differences in height of wetted surface on inner face 123'. Slot 121 can be of any width which will permit the water to climb therein by capillary action. The exit guide 124 keeps changes in the surface effects at the exit from affecting the liquid overflowing weir barrier 122, and provides a transition to downward flow from the horizontal flow over the weir barrier, and there must be a large enough distance between outer face 122''' of weir barrier 122 and outer face 124' of wall 118 to discourage horizontal flow from the weir, note dotted arrows, FIGURES 3 and 5. The lower end 125 of front wall 118 has angled sides 126 to insure stream formation at and only at the desired point of exit 125'. If the volume of the chamber behind the weir is made sufficiently large, it will smooth an intermittent flow so that the outflow is nearly constant, since the instant weir produces only small changes of flow with respect to chamber level. In practice it has been found that slot 121 widths of 1/32" to 1/8" were appropriate for the flows of 10–200 ml./min. most useful in this invention. However, the longer that weir barrier 122 is in plan, that is, the greater the dimension between the inner face 122" and outer face 122''', the more resistance to flow the weir will have. In the foregoing construction, the height of face 118 is on the order of 1 to 2 inches.

The weir in FIGURES 3–5 minimizes the effects of significant variance of surface effects, particularly variances in wetting, which could affect flow through more conventional weirs. In other words, the weir construction tends to cause the surface effects which affect flow to effectively remain constant or be removed physically from critical areas. The reason that it is necessary to take surface effects into consideration in equipment of the instant type is because of the low flows involved. In this respect as noted above the apparatus has a capacity of approximately 20 gallons of purified water a day which would mean that it produces approximately twice this much melted ice, assuming that the produced water is split evenly into wash water and potable product. It will be readily appreciated that if the flows from the weir varied, not only might there be spotty wash water application from weirs 106, 107, 108 and 109, but also the division of stream 83 would not be as accurate as required because its flow would not be even.

As can be seen from FIGURE 3, if the water level 117' in flow smoother or leveler 82 is below the level of the top 122' of the previously wetted weir barrier 122 the water will climb over the top of weir barrier 122 because of its capillary attraction with the sides of slot 121. As the level 117' rises, the water level in slot 121 will rise correspondingly, and the flow will be determined by the difference in elevation between levels 117' and 125' and the impedance to flow through slot 121. Above a certain minimum flow a stream rather than droplets will issue from the weir at 125', and still greater flows will then be linearly proportional to liquid level 117' until the level becomes so great that static force exceeds surface force in slot 121 and flow is no longer confined to channel 124.

If the sides of slot 121 are made of a material which wets reproducibly, such as oxidized copper, brass, or the like, the flow characteristics from the weir are reproducible over a wide range of flows. In other words, once the sides of slot 121 are wetted the pattern of wetting will remain fairly constant regardless of the level of liquid in the weir and thus the flow out of the weir will remain substantially constant for a given liquid level 117'. The characteristic of the weir construction of FIGURES 3–5 is that it will wet the surface of the sides of slot 121 in nearly the same manner regardless of the previous history of flow through the weir and regardless of the cleanliness of the surface of the sides of slot 121. Once the flow through slot 121 has been started by raising the liquid level sufficiently, the wetting of the sides of slot 121 will be the same for any given flow, and thus a given level will correspond with a given flow which is a requirement for good smoothing of varying flows.

In FIGURES 12 and 13 the dimensions for the outlet wall 118 of a flow leveling weir such as shown in FIGURES 3–5 are given. These dimensions are considered satisfactory when end wall 118 is made of oxidized brass.

In FIGURES 14, 15 and 16 the dimensions for an outlet wall 118 of a flow leveling weir such as shown in FIGURES 3–5 is shown when the outlet wall is made of a plastic material such as "Plexiglas."

A modified form of weir is shown in FIGURES 6 and 7 wherein three sections 127, 128 and 129 are provided with section 127 receiving the intermittent flow and there being a flow smoothing weir construction 130 between sections 127 and 128 and a flow smoothing weir construction 131 between sections 128 and 129 and a final weir construction for smoothing the flow 132 at the exit, the weir section 132 being a duplicate of the section shown in FIGURES 3–5. It will be appreciated that highly intermittent flows may be smoothed efficiently by the use of the construction shown in FIGURES 6 and 7 by causing the intermittent flow to be received within portion 127 of the flow smoothing weir. There is one variation in the weir construction in FIGURES 6 and 7, namely, that the weir barriers 130' and 131' are of a length which causes them to extend for the entire width of the weir wall portions 130 and 131 because there is no necessity to have a portion at the exit end to insure transition from horizontal to vertical flow, as portion 124 shown in FIGURES 3–5. Since weirs 130' and 131' are longer than weir 132', which is analogous to weir 122 of FIGURES 3–5, it will be appreciated that the former will provide a greater resistance to flow as explained above with respect to FIGURES 3–5, wherein it was indicated that the resistance to flow is proportional to the length of the weir, for a given width of the slot 121.

In FIGURE 8 a still further modified weir construction is shown wherein a plurality of weirs 150, 151, 152 and 153 are all placed along the face 154 of weir 155. This weir not only smooths a varying incoming flow in the same manner as described above with respect to FIGURES 3–5 but also simultaneously splits the flow into four streams each of which has a fixed relationship to the total stream. Each of the weirs 150, 151, 152 and 153 has the same construction as the weir described above in detail in FIGURES 3–5.

While preferred embodiments of the present invention have been disclosed, it will be appreciated that it may be otherwise embodied within the scope of the following claims.

We claim:

1. A device for splitting a flow and causing a portion of the split flow to be leveled comprising means for providing a constant flow of liquid in a substantially vertical direction, a rotatable disc having a predetermined periphery with a plurality of vanes projecting from said periphery with blank spaces therebetween whereby said vanes constitute a predetermined portion of said periphery, means for rotating said disc to cause said vanes to intermittently interrupt flow of said stream and thereby deflect a portion of said stream, and a flow leveler for intermittently receiving an interrupted portion of said stream and providing a smooth flow comprising a tank for receiving said interrupted flow, said tank including wall means and a bottom, slot means in said wall means extending in a substantially vertical direction, said slot means being of a width which will permit the liquid in said tank to climb in said slot means by capillary action, and a weir barrier in said slot means, said weir barrier having an upper portion lying above said bottom of said tank, and said slot means being fabricated from a wettable material.

2. A device as set forth in claim 1 wherein said wall means has an inner face and an outer face and wherein said weir barrier has an inner face and an outer face and wherein said inner face of said weir barrier lies between said inner and said outer faces of said wall means and is spaced from said inner face of said wall means.

3. A device as set forth in claim 2 wherein said outer face of said weir barrier is spaced from said outer face of said wall means and lies between said inner and outer faces of said wall means.

4. A multi-stage flow leveling weir construction for converting an uneven flow of liquid to an even flow comprising a first tank for receiving said uneven flow of liquid and a second tank adjacent to said first tank for containing said liquid prior to dispensing said even flow, said first and second adjacent tanks having first and second bottoms, respectively, a first wall separating said first and second tanks, first substantially vertically extending slot means in said first wall for effecting communication between said first and said second tanks, said first slot means being of a width which will permit liquid to climb therein by capillary action, a first weir barrier in said first wall, said first weir barrier having an upper portion located above said first and second bottoms, a second wall in said second tank, second substantially vertically extending slot means in said second wall for permitting liquid to flow out of said second tank, said second slot means being of a width which will permit the liquid to rise therein by capillary action, and a second weir barrier in said second wall, said second weir barrier having an upper portion located above said second bottom, and said second slot means being fabricated of wettable material.

5. A multi-stage flow leveling weir construction as set forth in claim 4 wherein said second wall has an inner face and an outer face and wherein said second weir barrier has an inner face and an outer face and wherein said inner face of said second weir barrier means is located between said inner and outer faces of said second wall and is spaced from said inner face of said second wall.

6. A multi-stage flow leveling weir construction as set forth in claim 5 wherein said outer face of said second weir barrier is located between said inner and said outer faces of said second wall and is spaced from said outer face of said second wall.

7. A flow leveling weir construction for dispensing a plurality of flows of liquid comprising a tank for receiving a liquid, said tank including wall means and a bottom, a plurality of spaced substantially vertically extending slot means in said wall means, each of said slot means being of a width for permitting the liquid in said tank to climb in each of said slot means by capillary action, and a weir barrier in each of said slot means, each of said weir barriers having an upper portion lying above the bottom of said tank, and each of said slot means being fabricated of a wettable material.

8. A flow leveling weir for converting small uneven flows of liquid to substantially even flows comprising a tank for receiving an uneven flow of said liquid, said tank including wall means and a bottom, slot means in said wall means extending in a substantially vertical direction, said slot means being of a width which will permit the liquid in said tank to climb in said slot means by capillary action, and a weir barrier in said slot means, said weir barrier having an upper portion lying above said bottom of said tank.

9. A flow leveling weir as set forth in claim 8 wherein said slot means is fabricated from wettable material.

10. A flow leveling weir as set forth in claim 9 wherein said wall means has an inner face and an outer face and wherein said weir barrier has an inner face and an outer face and wherein there is a sufficient distance between said outer face of said weir barrier and said outer face of said wall means for providing a transition from horizontal flow over said weir barrier to vertical flow.

11. A flow leveling weir as set forth in claim 10 wherein the distance between said inner and outer faces of said weir barrier is less than the distance between the inner and outer faces of said wall means.

12. A flow leveling weir as set forth in claim 11 wherein said inner face of said weir barrier is spaced from said inner face of said wall means and lies between said inner and outer faces of said wall means.

13. A flow leveling weir as set forth in claim 12 wherein said outer face of said weir barrier is spaced from said outer face of said wall means and wherein said outer face of said weir barrier lies between said inner and outer faces of said wall means.

14. A device for producing a plurality of constant streams of liquid from a single constant stream of liquid comprising means for providing said single constant stream of liquid, a plurality of adjacent trough-like compartments, means for effecting relative movement between said plurality of trough-like compartments and said single constant stream of liquid to cause each of said compartments to intermittently receive a portion of said constant stream of liquid, a liquid outlet portion forming a part of each of said trough-like compartments for intermittently discharging said portion of liquid intermittently received by an associated compartment, and a flow leveler associated with each of said trough-like compartments for providing a smooth flow from said intermittent discharge received from a respective liquid outlet portion associated with a respective compartment, each of said flow levelers comprising a tank including wall means and a bottom, slot means in said wall means extending in a substantially vertical direction, said slot means being of a width which will permit the liquid in said tank to climb in said slot means by capillary action, and a weir barrier in said slot means, said weir barrier having an upper portion lying above said bottom of said tank, and said slot means being fabricated from a wettable material.

15. A device as set forth in claim 14 wherein said single constant stream emanates from a stationary source and wherein both said trough-like compartments and said flow levelers are mounted for rotation in unison without relative rotation therebetween to thereby cause each of said compartments to remain in liquid receiving relationship to said single constant stream for a period of time determined by the rate of rotation of said compartments, said absence of relative rotation between said compartments and said flow levelers permitting said flow levelers to receive said intermittent discharge from associated liquid outlet portions.

References Cited

UNITED STATES PATENTS

| | | | |
|---|---|---|---|
| 1,032,657 | 7/1912 | Briggs | 239—193 |
| 1,078,775 | 11/1913 | Darrow | 137—262 |
| 1,635,414 | 7/1927 | Hirst | 73—215 |
| 2,281,799 | 5/1942 | Quave | 137—262 |
| 2,311,862 | 2/1943 | Palmquist | 137—576 |
| 2,438,327 | 3/1948 | Smalley | 137—262 |
| 2,582,523 | 1/1952 | Beglinger | 137—262 |
| 2,610,646 | 9/1952 | Michaelson et al. | 137—262 |
| 3,249,116 | 5/1966 | Hudson | 137—262 |

M. CARY NELSON, *Primary Examiner.*

W. CLINE, *Assistant Examiner.*